United States Patent Office 2,945,322
Patented July 19, 1960

2,945,322

PROTECTION OF SOIL IN AGRICULTURAL CULTIVATION

Rudolf Gaeth and Fritz Graf, Ludwigshafen (Rhine), Valentin Huppert, Limburgerhof, Pfalz, and Bernhard Wurzschmitt, Ludwigshafen (Rhine), Germany, assignors to Badische Anilin- & Soda-Fabrik Aktiengesellschaft, Ludwigshafen (Rhine), Germany No Drawing. Filed Dec. 18, 1957, Ser. No. 703,486

Claims priority, application Germany Dec. 21, 1956

6 Claims. (Cl. 47—9)

This invention relates to a new and improved method of protecting soil in agricultural cultivation.

The growth of plants is dependent not only on water, nutrients, heat and light, but also to a great extent on the soil structure. The alternation of rain and sunshine readily leads to incrustation of the soil and therefore to growth inhibition. The maintenance or improvement of the soil structure is brought about by mechanical working of the soil and the supply of organic substances, such as stable manure, peat and green manure, which is worked into the soil.

Attempts have already been made to improve the properties of the soil by mixing with the arable soil down to the depth of the roots, chemicals, such as lime or polymerization products, for example polyacrylic compounds, or also hardened condensation products in small pieces, for example finely-particled hardened urea-formaldehyde resins.

It has also already been proposed to protect soil for agricultural cultivation against the deterioration of its structure by covering it with strips of wood cellulose which are produced on the site. This method has not however been adopted in practice. A wood cellulose from the manufacture of paper and which is usually made liquid, contains more than 95% of water. This proposal therefore fails on the transport question. Moreover a covering of wood cellulose strips is troublesome in the working of the soil which is necessary soon after the young crops come up. These known strips do not disintegrate by themselves but form a coherent skin which is substantially impervious to air and moisture.

We have now found that soil for agricultural cultivation, after the usual preparation and sowing or planting, can be effectively protected against deterioration of its structure and the growth of the plants can be promoted, and also the development of weeds, fungi and insects can be prevented by covering the surface of the soil with a layer of porous aminoplast resins which has been produced on the spot.

Suitable porous aminoplast resins are those which are built up in the usual way on the basis of aminoplast-forming compounds and aldehydes. As aminoplast-forming compounds there may be used for example urea, thiourea or their thermal conversion products, for example biuret. Moreover aminotriazines are suitable, especially triaminotriazine (melamine), but also amino-triazines which contain less than three amino groups, as for example di-amino-triazines, and also dicyanidiamide, guanamide and its derivatives as well as derivatives of the other aminoplast-forming compounds mentioned, for example N-alkyl or N-aryl substituted ureas, such as methyl-, ethyl-, propyl- or butyl-ureas or phenyl-urea. In general these aminoplast-forming compounds are reacted with formaldehyde or its polymers, for example paraformaldehyde, to form aminoplasts, but acetaldehyde and also in some cases propionaldehyde or butyraldehyde can be successfully allowed to act on the aminoplast-forming compounds. The addition products or precondensates formed from these components (aminoplast-forming compounds and aldehydes) must be soluble in water. In general they consist of methylol compounds of the aminoplast-forming compounds, for example mixtures of mono-, di- and tri-methylol-ureas, but they may also be further condensed with the splitting off of water, the formation of ether and possibly methylene bridges, provided these products are still soluble in water. The aminoplast-forming compounds may be reacted with the aldehydes in a wide range of relative proportions. A relative proportion of about 1 mol of urea to 1 to 1.4 mols of formaldehyde has proved to be especially advantageous. For many purposes however it is possible to use a large excess of aldehyde, for example up to 2 or even 2.5 mols of formaldehyde to 1 mol of urea. Conversely condensates may also be used which are produced with an excess of urea and which contain up to 1.2 mols of urea for each mol of formaldehyde. In general such an amount of aldehyde is allowed to act on the aminoplast-forming compound that there are 0.5 to 2.2 mols of formaldehyde for each amide or amino group.

It is especially advantageous to harden the resultant condensation products with acid catalysts. Especially suitable acid hardening agents are the compounds usual for hardening aminoplasts, especially inorganic or organic acids or acid salts of these acids. As examples there may be mentioned sulfuric acid, hydrochloric acid, phosphoric acid, oxalic acid, maleic acid, lactic acid, ammonium chloride, ammonium phosphates, ammonium sulfates or alkali phosphates. The said salts may still contain acid hydrogen atoms.

For the preparation of the porous aminoplast resins, the aqueous solutions of the said addition products or precondensates of aminoplast-forming substances and aldehydes are foamed up. This foaming up preferably takes place in the presence of a surface-active wetting agent. As such, anionic wetting agents are especially suitable, for example naphthalene sulfonic acids or alkylnaphthalene sulfonic acids, and also esters of fatty alcohols with about 10 to 28 carbon atoms with sulfuric acid or sulfuric acid esters of polyglycol ethers, for example from alkylated phenols, such as hexylheptyl-beta-naphthol with 2 to 10 mols of ethylene oxide, or addition products of sulfuric acid and unsaturated fatty alcohols with ethylenic double linkages, addition products of sulfuric acid and alpha,beta-unsaturated dicarboxylic acids, for example maleic acid esters, such as sulfo-succinic acid esters, as well as high molecular weight carboxylic acids, especially fatty acids, with about 10 to 28 carbon atoms. Instead of the free acids there may also be used their water-soluble salts, for example their alkali salts. Fundamentally there may be used not only anionic wetting agents, but also cationic and non-ionogenic wetting agents, as for example alkoxylated fatty amines, especially ethoxylated fatty amines, for example the reaction product of oleylamine or stearylamine with 5 to 20 mols of ethylene oxide, and also quaternary ammonium compounds which contain alkyl radicals of high molecular weight, for example with about 10 to 28 carbon atoms, as well as alkoxylation products of high molecular weight fatty acids or fatty alcohols with about 10 to 28 carbon atoms, especially their hydroxyethylation products which contain 5 to 40 mols of ethylene oxide per mol of fatty acid or fatty alcohol. Belonging to these are for example the reaction products of oleyl alcohol with 15 to 25 mols of ethylene oxide. Protective colloids, such as polyacrylic acid salts or casein, may also be used with the said wetting agents. The hardening time is regulated in the usual way by the amount of hardening agent added and thus adapted to the local conditions. The solidification of the foamlike resin takes place in a short time. After as short a time as about 30 seconds to a few minutes, the foamlike resin is present in a solid state in which it is no longer deformable.

The hardenable foam of the aqueous solution of the hardenable aminoplasts, which already contain the hardening agent and if desired a wetting agent, is prepared in the usual way. In general a gas is used as the foaming agent, the gas being led into the solution to be foamed. Especially suitable inert gases are for example nitrogen, oxygen, air, carbon monoxide, ammonia or hydrogen sulfide. The aqueous solution to be foamed suitably contains about 15 to 35% by weight of the hardenable condensation product, and especially about 25 to 35%. The wetting agent is added in general in amounts between 0.5 and 1.5% by weight with reference to the solution of the condensation product, and the hardening agent advantageously in amounts between 0.5 and 1.5% by weight with reference to the condensation product to be hardened. An excess of the indifferent gas used as foaming agent is harmless. Another way of carrying out this usual process is by the addition of the acid hardening catalyst to the foam which has already been prepared. In this case it is preferable to mix an aqueous condensate solution with a wetting agent, to foam this solution in a foaming chamber and then during or immediately after the foaming to add the hardening agent solution while stirring vigorously or otherwise causing movement thereof. Alternatively an aqueous solution of the wetting agent may first be foamed, the aqueous condensate solution stirred or blown into this preformed foam and the hardening agent added at the same time or immediately before the foam issues from a spraying nozzle.

The hardenable aminoplast resin foam is suitably produced in a transportable apparatus which may be mounted for example on a vehicle. The resin solution may be situated in one container and the solution of the hardening agent for the condensation product in a second container. When a wetting agent is used, it may be contained either in the resin solution or in the hardening agent solution. The two solutions are combined in a mixing chamber and foamed therein. The foaming may be effected by vigorous mechanical movement by which air is sucked into the mixing chamber. The solutions may however also be foamed by means of an indifferent gas which is under pressure.

The foam formed in the mixing chamber may then be applied with the aid of conventional nozzles, especially nozzles having a wide slot, to the surface of the soil where it rapidly hardens. As nozzles use may be made of all those which are customary for other purposes, for example in the usual foam fire-extinguishing apparatus.

In many cases it is sufficient to cover the rows of seeds or the space between the rows of plants with the foamed resin in the form of strips, but obviously the entire surface of the soil may be covered. The thickness of the layer of foamed resin may be varied within wide limits. For reasons of economy the layer of foam applied in general has a thickness of about 1 to 10 millimetres, but it may be considerably thicker, for example up to several centimetres. The foam may be pressed onto the surface of the soil, for example with the aid of a roller, which may be corrugated or if desired provided with spiked projections. The most favourable bulk density of the hardened synthetic resin foam lies between about 3 and 15 kilograms per cubic metre, but it may also be considerably higher, for example up to about 50 or even 100 kilograms per cubic metre.

The proposed coating layers disintegrate spontaneously as soon as they have fulfilled their task of protecting the soil during the period in which the plants cannot themselves undertake this protection. They are an excellent, slow-acting source of nitrogen. Since the proposed soil covering, depending on the amount of foam resin applied, can be made more or less porous, it permits the passage of air and at the same time prevents the destruction of the soil surface by pelting rain but nevertheless permits the penetration of the rain water into the soil. At the same time the evaporation of water is controlled and the soil protected against erosion. A further considerable advantage of the proposed process consists in the fact that fertilisers, plant nutrients, weed killers, insecticides and fungicides as well as dark dyestuffs or pigments may be added to the aminoplast foam. Many of the compounds which are hardening agents already have fertilising properties, such as phosphoric acid, salts of phosphoric acid, ammonium sulfate and ammonium chloride. Furthermore there may be added to the aminoplast foam other nitrogen compounds, for example ammonium nitrate, ammonia, alkali nitrates, urea, crude calcium cyanamide or cyanamide, and also phosphorus compounds, for example tricalcium phosphate or trace elements, such as magnesium, manganese, copper, iron or boron, preferably in the form of their root-soluble salts.

Suitable weed killing agents which may be co-employed are for example weed killing agents containing growth substances, such as dichlorphenoxyacetic acid, methylchlorphenoxyacetic acid, and also propionic acid derivatives, such as alpha-dichlorpropionic acid. There may also be used N-para-chlorphenyl-N'-dimethylurea, N-phenylisopropyl carbamate, N-metachlorphenylisopropyl carbamate or cyclo-octyldimethylurea. Suitable insecticides are for example hexachlorcyclohexane and 1.2.3.4.10.10 - hexachlor - 1.4.4A.5.8.8A - hexahydro - 1.4.5.8 - endoexodimethanonaphthalene, i.e. the insecticides available in commerce under the names Lindan and Aldrin.

All the usual inorganic and organic fungicides may be co-employed, for example copper compounds, sulfur, chlorinated and nitrated benzenes, for example hexachlorbenzene, and also dithiocarbamic acid compounds.

The addition of dark dyestuffs or pigments is to be recommended when it is desired that the synthetic resin foam should impart a heat-absorbing action. All such pigments may be used, for example carbon black or dark modification of iron oxides.

The weed killers, insecticides and fungicides to be used together with the aminoplast foam are used in the amounts in which they are usually employed per hectare of soil surface. In general this is about 1 to 4 kilograms per hectare, but in many cases considerably more may be used, namely up to about 20 kilograms per hectare. In many cases these additional substances can be worked in with the aminoplast foam. In general they are strewed on the soil surface separately from the aminoplast foam or sprayed on from their aqueous or, rarely, their organic solutions, emulsions or dispersions.

What we claim is:

1. A process for protection of soil in agricultural cultivation which comprises covering the surface of said soil with a layer of a formed aqueous solution of about 15 to 35% by weight of a water-soluble, hardenable aminoplast resin, said solution containing an acid hardening agent and a surface-active wetting agent, and hardening the foamed layer by condensation of said resin to form a porous solid covering over the surface of said soil.

2. A process as claimed in claim 1 wherein the foamed aqueous solution contains about 25 to 35% by weight of said aminoplast resin.

3. A process as claimed in claim 1 wherein the foamed layer is applied to said soil in a thickness of about 1 to 10 millimeters.

4. A process as claimed in claim 1 wherein an anionic wetting agent is employed as the surface-active agent in the production of the hardenable foam.

5. A process as claimed in claim 1 wherein the hardened resin foam is a urea-formaldehyde condensation product.

6. A process as claimed in claim 5 wherein the bulk density of the hardened resin foam is about 3 to 100 kilograms per cubic meter.

References Cited in the file of this patent

UNITED STATES PATENTS

| | | |
|---|---|---|
| 1,882,377 | Whittelsey | Oct. 11, 1932 |
| 1,995,853 | Hunsaker | Mar. 26, 1935 |
| 2,875,555 | Thiegs | Mar. 3, 1959 |

FOREIGN PATENTS

| | | |
|---|---|---|
| 486,113 | Great Britain | May 27, 1938 |
| 583,218 | Great Britain | Dec. 12, 1946 |

OTHER REFERENCES

Ser. No. 340,363, Löwenstein (A.P.C.), published April 27, 1943.

UNITED STATES PATENT OFFICE

CERTIFICATE OF CORRECTION

Patent No. 2,945,322

July 19, 1960

Rudolf Gaeth et al.

It is hereby certified that error appears in the printed specification of the above numbered patent requiring correction and that the said Letters Patent should read as corrected below.

Column 4, line 57, for "formed" read -- foamed --.

Signed and sealed this 10th day of January 1961.

(SEAL)
Attest:
KARL H. AXLINE
Attesting Officer

ROBERT C. WATSON
Commissioner of Patents